United States Patent [19]

Yoshimura et al.

[11] 4,322,327

[45] Mar. 30, 1982

[54] SLOW-CURING WATER-CURABLE URETHANE PREPOLYMER COMPOSITION

[75] Inventors: Naoki Yoshimura; Kenji Hijikata; Noritaka Hosokawa, all of Yokkaichi, Japan

[73] Assignee: Mitsubishi Petrochemical Co., Ltd., Tokyo, Japan

[21] Appl. No.: 196,831

[22] Filed: Oct. 14, 1980

[30] Foreign Application Priority Data

Oct. 19, 1979 [JP] Japan .............................. 54/134756
Feb. 5, 1980 [JP] Japan .............................. 55/12877
Feb. 12, 1980 [JP] Japan .............................. 55/15745
Jul. 22, 1980 [JP] Japan .............................. 55/100172

[51] Int. Cl.$^3$ ............................................. C08L 75/00
[52] U.S. Cl. .................................. 524/507; 525/329; 525/437; 525/440; 525/452; 528/45; 528/49; 528/59; 528/73; 524/705; 524/839; 524/916; 523/130
[58] Field of Search ..... 260/28 R, 29.2 TN, 29.6 NR, 260/29.7 NR; 525/329, 437, 440, 452; 528/45, 49, 59, 73

[56] References Cited

U.S. PATENT DOCUMENTS 4,016,120 4/1977 Matsuda et al. ............ 260/29.2 TN
4,098,933 7/1978 Burkhardt et al. ................... 528/45
4,200,725 4/1980 Gras et al. ............................. 528/45

*Primary Examiner*—Maurice J. Welsh
*Attorney, Agent, or Firm*—Oblon, Fisher, Spivak, McClelland & Maier

[57] ABSTRACT

A novel slow-curing water-curable urethane prepolymer composition obtained by reacting (A) a hydrophilic urethane prepolymer which is a reaction product of a polyisocyanate and a hydrophilic polyol prepolymer and has at least two —NCO groups and (B) a blocking agent selected from a class consisting of heterocyclic compounds having an

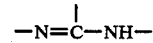

structure in the molecule thereof, hydroxypyridines and hydroxyquinolines in the proportion that the equivalent ratio of the =NH groups of the —OH groups in the blocking agent (B) to the —NCO groups in the hydrophilic urethane prepolymer (A), that is, —OH or =NH/—NCO ratio, is 0.05 to 2 is disclosed. This composition is remarkably useful as a grouting material, for forming hydrogel which is effective as a fixative or carrier of various materials, as a vehicle for coating materials, and as a stabilizer and thickener for aqueous resin emulsions.

15 Claims, 2 Drawing Figures

SLOW-CURING WATER-CURABLE URETHANE PREPOLYMER COMPOSITION

TECHNICAL FIELD

This invention relates to a slow-curing water-curable urethane prepolymer composition which has excellent storage stability and slowly reacts with water to form hydrogel at ordinary temperature and use of the same.

BACKGROUND OF THE INVENTION

The so-called urethane tar, which forms a satisfactory waterproof coating membrane, has been used as a protective coating for wood, concrete and other materials for a long time. However, not only the urethane tar coating but polyurethane coating materials in general often cause bubbling when water is present in the articles to be coated or the coating instrument. The user must be extremely careful for existence of water and thick coating must be carefully avoided.

The conventional water-curable urethane materials are used for filling cracks in concrete structures or for grouting the ground or soil. But in this case, the urethane materials are cured with water in 2-5 minutes, and therefore, penetration or infiltration of the materials into the cracks or the soil is not sufficient enough to repair the cracks or to strengthen the soil.

We got the idea that if the curing time of the urethane material could be prolonged, carbon dioxide gas generated in the course of curing of the material would easily escape out of the hardening resin system and the resulting cured polymer would contain very few or no bubbles. So, we tested various urethane materials and we have found that some urethane prepolymers require a long time for curing and form hydrogel containing extremely few or no bubbles in the presence of water. The finding has led us to this invention.

DISCLOSURE OF THE INVENTION

This invention provides a slow-curing water-curable urethane prepolymer composition obtained by reacting (A) a hydrophilic urethane prepolymer which is the reaction product of a polyisocyanate and a hydrophilic polyol prepolymer and has at least two free —NCO groups and (B) a blocking agent selected from a class consisting of heterocyclic compounds having an structure in the molecule thereof, hydroxypyridines and hydroxyquinolines in such a proportion that the equivalent ratio of the =NH groups or the —OH groups in the blocking agent (B) to the —NCO groups in the hydrophilic urethane prepolymer (A) (=NH or —OH/NCO) is 0.05 to 2. The principal ingredient of this composition is a urethane prepolymer, the NCO groups of which are blocked. Therefore, hereinafter in the specification it is referred to as the blocked urethane prepolymer composition.

The composition of this invention is useful as a grouting material; as a hydrogel former usable as fixative for perfumes or carrier for fertilizers; as a vehicle for coating materials; as a thickener for aqueous resin emulsions; or as a modifier for aqueous resin emulsions to prevent re-emulsification in the course of curing.

Examples of the polyisocyanate as the starting material of the component (A) of the composition of this invention are: aliphatic, cycloaliphatic, aromatic-substituted aliphatic, aromatic or heterocyclic polyisocyanates, specifically, such as ethylene diisocyanate, 1,4-tetramethylene diisocyanate, 1,6-hexamethylene diisocyanate, 1,2-dodecane diisocyanate, cyclobutane-1,3-diisocyanate; cyclohexane-1,3- or -1,4-diisocyanate or mixtures of these isomers; 1-isocyanato-2-isocyanatomethylcyclopentane, 1-isocyanato-3,3,5-trimethyl-5-isocyanatomethylcyclohexane; 2,4- or 2,6-tolylene diisocyanate or mixtures of these isomers; hexahydro-1,3- or -1,4-phenylene diisocyanate or mixtures thereof, perhydro-2,4'- or -4,4'-diphenylmethane diisocyanate or mixtures thereof; 1,3- or 1,4-diphenylene diisocyanate or mixtures thereof; 2,4- or 2,6-tolylene diisocyanate or mixtures thereof; 1,2-, 1,3- or 1,4-xylylene diisocyanate or mixtures thereof; diphenylmethane-2,4'- or 4,4'-diisocyanate or mixtures thereof; naphthalene-1,5-diisocyanate, triphenylmethane-4,4',4''-triisocyanate; polyphenylpolymethylene polyisocyanates such as obtained by condensing aniline with formaldehyde and phosgenizing the condensates; and mixtures of these compounds.

Of these, 2,6-tolylene diisocyanate, 2,4-tolylene diisocyanate, diphenylmethane-4,4'-diisocyanate, 1,2-xylylene diisocyanate, 1,3-xylylene diisocyanate, 1,4-xylylene diisocyanate, naphthalene diisocyanate, polyphenylene diisocyanate, 1,6-hexamethylene diisocyanate and mixtures of these are preferred from the view points of curing time, stability and cost of the resulting blocked urethane prepolymer composition.

Examples of the hydrophilic polyol prepolymer of the component (A) of the composition of this invention are the following polyols (a)-(f):

(a) addition polymerization products of ethylene oxide the molecular weight of which is 1,000 to 20,000;

(b) polyether-polyols which are a copolymer of ethylene oxide and an alkylene oxide having 3-6 carbon atoms in an amount of not more than 50 mole percent of said copolymer, said copolymer having molecular weight 1,000-20,000;

(c) addition products of an aliphatic amine, an aliphatic amide, a dicarboxylic acid or a multifunctional alcohol and ethylene oxide, such as ethylene oxide addition product of coco amine, soy bean amine, tallow amine, stearyl amine, ethylene diamine, tetramethylene diamine, hexamethylene diamine, piperadine; hydrogenated tallow amide, oleyl amide; phthalic acid, maleic acid, succinic acid, adipic acid; trimethylol propane, glycerine, etc.;

(d) polyester-polyols such as ethylene oxide addition products of copolyesters of tetramethylene glycol, polyethylene glycol, etc. and phthalic acid, maleic acid, succinic acid, malonic acid and adipic acid; etc.; and coesters of polyethylene glycol having molecular weight not less than 200 and phthalic acid, maleic acid, succinic acid, malonic acid or adipic acid which have —OH groups at the ends of the molecule;

(e) polyacryl-polyols such as copolymers of styrene, acrylic ester or methacrylic ester, etc. and hydroxyethyl acrylate or hydroxyethyl acrylate, etc.;

(f) polyols having at least one of —OSO₃M, wherein M stands for a monovalent alkali metal, and quaternary ammonium radicals and more than one —OH groups in their molecule.

Of these, polyether-polyols of (a) and (b) having molecular weight 1,000–20,000 are preferred from the viewpoint of hydrophilic property of the resulting blocked prepolymers.

The componet (A) urethane prepolymer is obtained by reacting one of the above-mentioned polyisocyanates and one of hydrophilic polyol prepolymers of the above (a) through (f), in such a proportion that the equivalent ratio of —OH groups in said polyol prepolymer to —NCO groups in the polyisocyanate (OH/-NCO) is 0.5 to 1.0 for 1 to 50 hours at 20° to 120° C.

The resulting component (A) urethane prepolymer must have at least two —NCO groups in its molecule, and should preferably have molecular weight of 1,000 to 20,000.

Of the component (B) blocking agent of the composition of this invention, as the heterocyclic compound having compounds represented by the following formulas (I)–(V) can be employed.

(I)

(II)

(III)

(IV)

(V)

wherein $R^1$ is a member selected from hydrogen, $C_nH_{2n+1}$, $C_6H_5$ and $CH_2C_6H_5$; $R^2$ is a member selected from Cl, $OCH_3$ and $SCH_3$; $R^3$ is a member selected from $CH_3$, $C_2H_5$ and $CH(CH_3)_2$; and n is an integer of 1–6.

Specific examples thereof are: imidazole, benzimidazole, 2-methylimidazle, 2-ethylimidazole, 2-phenylimidazole, 1,2,4-triazole, 2-methylimidazoline, 2-phenylimidazoline, 2-chloro-4,6-bis-ethylamino-S-triazine, 2-methoxy-4,6-bis-ethylamino-S-triazine, etc.

Hydroxypyridines and hydroxyquinolines as the component (B) are represented by the formulas (i) to (iii).

(i)

(ii)

(iii)

Specifically, they are 2-hydroxypyridine, 3-hydroxypyridine, 4-hydroxypyridine, 2-hydroxyquinoline, 4-hydroxyquinoline and 8-hydroxyquinoline.

Out of these, a suitable one is selected by considering the curing time of the resulting slow-curing water-curable urethane prepolymer composition.

In combination with these blocking agents, a conventional blocking agent such as phenol, ε-caprolactam, benzophenoneoxim can be used. In this case, the latter is used in an amount not more than 3 times the molar amount of the component (B). Usually no catalyst is required, since the component (B) acts as the catalyst. However, a known catalyst such as 1,4-diazabicyclo-[2,2,2]-octane may be used.

As the blocking agent for the urethane prepolymer, phenols, ε-caprolactam, benzophenone-oxim have hitherto been used. But the urethane prepolymers blocked with only these blocking agents hardly gel or take an extremely long time to gel when they are dissolved or dispersed in water and are allowed to stand at ordinary temperature. Therefore such blocked urethane prepolymers are scarcely useful.

In preparing the composition of this invention, the blocking agent is mixed with the hydrophilic urethane prepolymer (component A) obtained by reacting the hydrophilic polyol prepolymer with the above-mentioned polyisocyanate in such a proportion that the equivalent ratio of —OH or =NH groups of the blocking agent to the free —NCO groups of said urethane prepolymer (OH or NH/NCO) is 0.05–2.

When the heterocyclic compound having the structure is used as the component B and no other conventional blocking agent such as phenols are used in combination, the NH/NCO equivalent ratio should preferably be 0.2–2.

The mixture undergoes the reaction to form slow-curing water-curable blocked urethane prepolymer by being allowed to stand for 1–150 hours after admixing at 0°–150° C., preferably for 1–4 hours at 50°–90° C.

It will be needless to say that the reason why this blocked urethane prepolymer composition is very slowly cured in the presence of water is that polymerization is retarded by the attached blocking groups, which take time to be removed.

When the curing time of the blocked urethane prepolymer composition is desired to be 30 minutes to several hours, imidazole, 1,2,4-triazole and hydroxypyridine, etc. are preferred as the blocking agent; and when the curing time is desired to be a half day to a full day, benzimidazole, 2-methylimidazoline, 2-phenylimidazoline, hydroxyquinoline etc. are preferred.

The blocked urethane prepolymers composition of this invention is hydrophilic, and dissolves or is emulsified in water. The aqueous solution or emulsion forms hydrogel containing few or no bubbles in 20 minutes to 2 days.

Water is used in a proportion of 10-10,000 parts by weight per 100 parts by weight of the blocked urethane prepolymer composition. The preferred amount of water is 25-2,000 parts per 100 parts of said composition.

To the blocked urethane prepolymer composition of this invention, various additives such as poly(vinyl alcohol), polyvinylpyrrolidone, CMC, inorganic fillers, pigments, perfumes or emulsions of various kinds when it is used to form hydrogel in accordance with the aimed use.

The blocked urethane prepolymer composition of this invention per se is useful as a grouting agent, and a hydrogel former. And paper, non-woven fabric, wall and ceiling materials impregnated with the aqueous solution of this composition containing poly(vinyl alcohol), polyvinylpyrrolidone, CMC, starch, etc., which are allowed to gel, are good building materials having excellent adhesive property. The composition of this invention mixed with tar emulsion is useful as an anticorrosion agent.

Another remarkable use of this blocked urethane prepolymer composition is improvement of aqueous resin emulsions. Various aqueous resin emulsions are widely used as a caulking material, sealant, wall coating, adhesive-water proofer for mortar, etc.

Previously, when these emulsion materials were used outdoors, if water was newly added by some reason, for instance, by rain before they were dried up after they had been coated, they re-emulsified (returned to sol) and the emulsion materials could not give uniform coating layers and in the worst case they were washed away. Therefore, these materials could be used only on days when good weather was assured.

It would have been easily inferred to prevent re-emulsification (returning to sol) of the aqueous resin emulsions in the course of curing by adding ordinary urethane prepolymers (component A) to said emulsions and reacting them with the latter. But the unblocked urethane prepolymers violently react with water or the resin components in the emulsion causing bubbling, and thus they do not give a uniform coating, and also their pot life is very short. Therefore the idea has not practically been realized.

We synthesized various blocked isocyanate compounds and tested, and found that the blocked urethane prepolymer composision of this invention slowly reacts with water to form gel without bubbling and gives coating layers having good adherence and flexibility; and thus a satisfactory pot life of 1 hour to 5 days can be secured and that re-emulsification of the curing emulsion can be prevented.

The aqueous emulsions to which the blocked urethane prepolymer composition of this invention can be added for the above-mentioned purpose are: emulsions of ethylene-vinyl acetate copolymer, atactic polypropylene, bitumen materials, poly(vinyl acetate), poly(acrylic ester), acrylic ester-vinyl acetate copolymer, acrylic ester-styrene copolymer, vinyl chloride-vinylidene chloride copolymer, chloroprene rubber, styrenebutadiene rubber, etc.

For the above-mentioned purpose, the blocked urethane prepolymer composition of this invention is used in an amount of 2-10 parts by weight, preferably 2-5 parts by weight per 100 parts by weight of the solid ingredients in the aqueous resin emulsion. Less than 2 parts by weight is not enough to prevent re-emulsification. On the other hand, use of more than 10 parts by weight does not give correspondingly improved effect in prevention of re-emulsification and thus is impractical.

The blocked urethane prepolymer composition of this invention is useful as a thickener for aqueous resin emulsions, too.

Aqueous emulsions of various resins are widely used as a caulking agent, sealant, wall paint and waterproofer for mortars. In these applications a different viscosity is required for each use, and it is often necessary to increase the viscosity of the emulsion according to the end use.

Heretofore, in order to give emulsions proper viscosity, poly(vinyl alcohol), polyvinylpyrrolidone, methyl cellulose, CMC, hydroxyethyl cellulose, poly(sodium acrylate), casein, starch, etc. have been used as the thickener.

However, these conventional thickeners are limited in their thickening ability. In order to give emulsions sufficient viscosity, CMC, for instance, must be added in an amount of 5-10% by weight of the resin ingredients in the emulsion. Addition of such a large amount causes incompatibility of the thickener and the resin in the dried emulsion, which resulted in undesirable effect on the strength, luster, water resistance, etc. of the finished goods.

The urethane prepolymer resulting from the reaction of a hydrophilic polyol prepolymer and a polyisocyanate, that is, the component A in this invention, has been used as a soil improver and gelling agent so far. But said urethane prepolymer instantly gives hardened gel when it is introduced into an aqueous emulsion. We have found that blocked urethane prepolymer composition of this invention does not form hardened gel, but rather exhibits remarkable thickening effect when it is added to an aqueous emulsion in a small amount.

Aqueous resin emulsions can be effectively thickened adding the blocked urethane prepolymer composition in an amount of 0.05-2 parts by weight per 100 parts by weight of the solid ingredients of the emulsion.

Aqueous resin emulsions which can be thickened are not limited in particular. Examples thereof are aqueous resin emulsions of ethylene-vinyl acetate copolymer, atactic polypropylene, bitumen materials, poly(vinyl acetate), poly(acrylic acid), poly(acrylic ester), acrylic ester-vinyl acetate copolymer, acrylic ester-styrene copolymer, vinyl chloridevinylidene chloride copolymer, chloroprene rubber, styrenebutadiene rubber, etc.

Now the invention is explained in detail by way of working examples, comparative examples and examples of use with reference to the attached drawings.

DESCRIPTIONS OF PREFERRED EMBODIMENTS OF THE INVENTION

In the following working examples, comparative examples and examples of use, parts and percentages are all those by weight unless specifically defined otherwise.

EXAMPLE 1

Eighty-two point eight (82.8) parts of polyetherpolyol having molecular weight 4,000 which is an addition product of ethylene oxide (90 mole %) and propylene oxide (10 mole %) was reacted with 17.2 parts of tolylene diisocyanate (a mixture of 80% of 2,4-tolylene diisocyanate and 20% of 2,6-tolylene diisocyanate) and hydrophilic urethane prepolymer (A) containing 10% of unreacted tolylene diisocyanate was obtained. The amount of the free NCO groups in this urethane prepolymer was 6.56%.

To 90 parts of this hydrophilic urethane prepolymer (A), 10 parts of imidazole was added, and the mixture was stirred for reaction at 90° C. for 2 hours. Thus 100 parts of imidazole-blocked urethane prepolymer composition was obtained. This blocked urethane prepolymer composition was analyzed by IR absorption spectrometry and no absorption at 2250 cm$^{-1}$ for the NCO group was recognized and thus it was confirmed that there existed no free NCO group.

Twenty (20) parts of this blocked urethane prepolymer composition was dissolved in 80 parts of water and the solution was allowed to stand at 20° C. After 40 minutes, transparent hydrogel containing no bubbles was formed.

Gelling time and gelling temperature of a 20% solution of this blocked urethane prepolymer composition were measured. The results are shown by curve A in FIG. 1.

Figure 2:
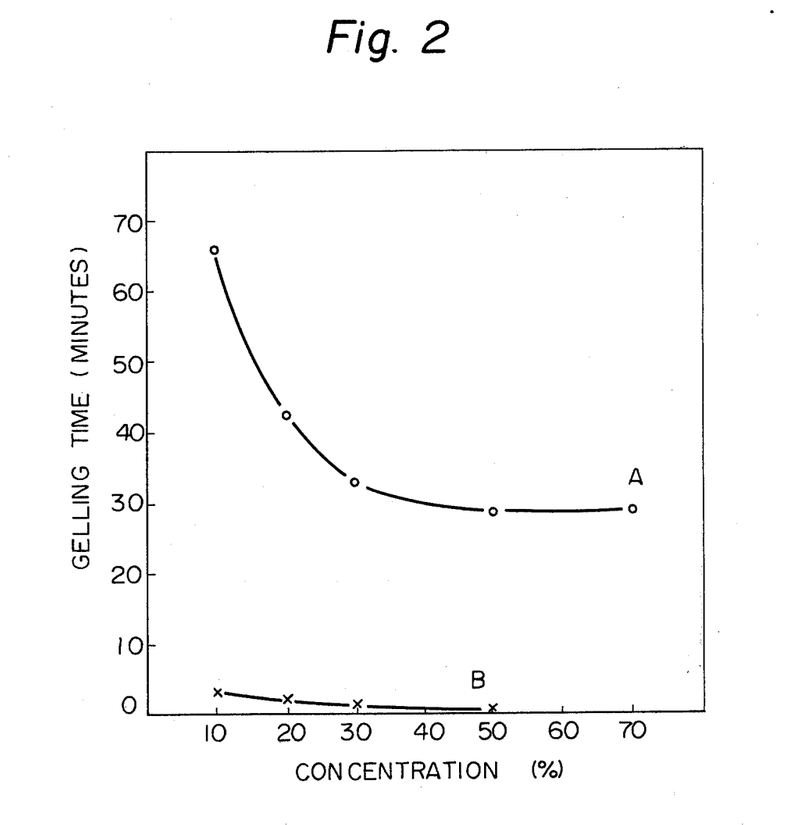
FIG. 2 is a diagram showing the relation between the concentration and the gelling time of the aqueous solutions of the blocked and unblocked urethane prepolymer. In these drawings, curve A represents the blocked urethane prepolymer of this invention and curve B represents unblocked urethane prepolymer (the component (A)).

Further gelling time of aqueous solutions of this blocked urethane prepolymer composition of various concentrations at 20° C. was measured, and the results are shown by curve A in FIG. 2.

Figure 1:
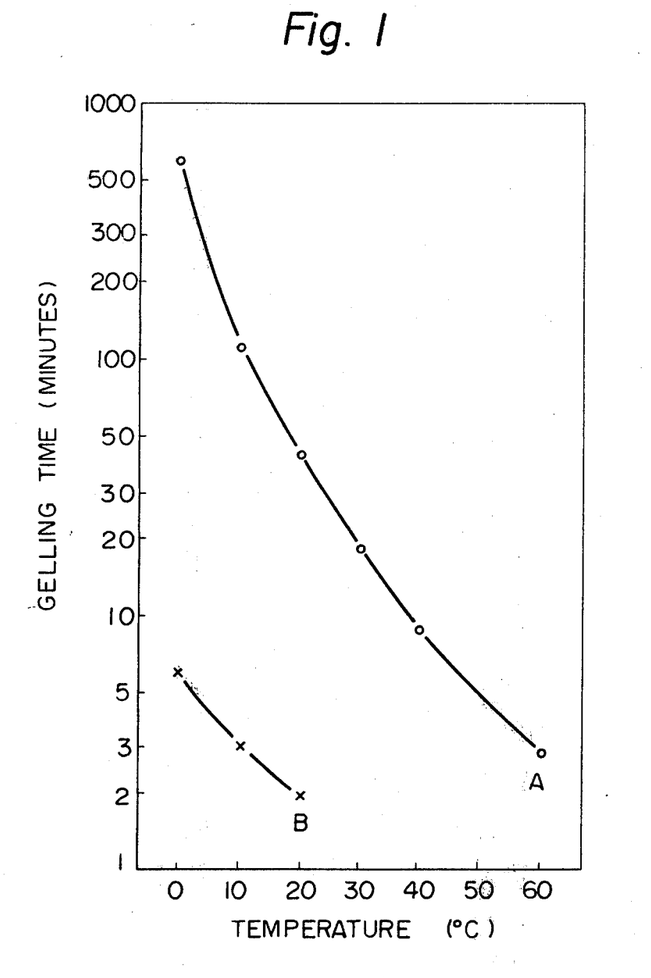
FIG. 1 is a diagram showing relation between the gelling temperature and gelling time of the aqueous solutions of the blocked and unblocked urethane prepolymer.

For the purpose of comparison, with respect to the hydrophilic urethane prepolymer (A) which was not blocked with imidazole, the same measurements were carried out and the results are shown by curve B in FIG. 1 and FIG. 2.

EXAMPLE 2

One hundred (100) parts of the hydrophilic urethane prepolymer (A) used in Example 1 and 11.4 parts of 1,2,4-triazole were reacted under agitation at 60° C. for 4 hours, and thus 111.4 parts of 1,2,4-triazole-blocked urethane prepolymer composition was obtained. Ten (10) parts of this blocked urethane prepolymer composition was dissolved in 90 parts of water and the solution was allowed to stand at 30° C. After 80 minutes, milky white hydrogel containing no bubbles was obtained.

EXAMPLE 3

One hundred (100) parts of the hydrophilic urethane prepolymer (A) used in Example 1 and 13.5 parts of 2-methylimidazoline were reacted under agitation at 80° C. for 3 hours, and thus 113.5 parts of 2-methylimidazoline-blocked urethane prepolymer composition was obtained. Thirty (30) parts of this blocked urethane prepolymer composition was dissolved in 70 parts of water and the solution was allowed to stand at 25° C. After 12 hours, transparent hydrogel containing no bubbles was obtained.

EXAMPLE 4

One hundred (100) parts of the hydrophilic urethane prepolymer (A) used in Example 1 and 19.3 parts of benzimidazole were reacted under agitation at 70° C. for 2 hours, and thus 119.3 parts of benzimidazole-blocked urethane prepolymer composition was obtained. Twenty (20) parts of this blocked urethane prepolymer composition was dissolved in 80 parts of water and the solution was allowed to stand at 30° C. After 13 hours, milky white hydrogel containing no bubbles was obtained.

EXAMPLE 5

One hundred (100) parts of a urethane prepolymer which was obtained by reacting polyethylene glycol having molecular weight 2,000 and the tolylene diisocyanate used in Example 1 and contained 3.6% of free NCO groups was reacted with 6.2 parts of imidazole under nitrogen at 90° C. for 2 hours. Thus 106.2 parts of imidazole-blocked urethane prepolymer composition was obtained.

Ten (10) parts of this blocked urethane prepolymer composition was dissolved in 90 parts of water and was allowed to stand at 20° C. After 70 minutes, transparent hydrogel containing no bubbles was obtained.

EXAMPLE 6

A polyether-polyol which was an addition copolymer of 70 mole % of ethylene oxide and 30 mole % of propylene oxide and had molecular weight 8,000 was reacted with an excess amount of the tolylene diisocyanate (a mixture of 80% of 2,4-tolylene diisocyanate and 20% of 2,6-tolylene diisocyanate) used in Example 1, and a urethane prepolymer containing 5% of unreacted tolylene diisocyanate was obtained. (The free NCO group content was 3.3%)

One hundred (100) parts of this hydrophilic urethane prepolymer (A) was reacted with 5.6 parts of imidazole under agitation at 70° C. for 5 hours and thus 105.6 parts of imidazole-blocked urethane prepolymer composition was obtained.

Twenty (20) parts of this blocked urethane prepolymer composition was dissolved in 80 parts of water and the solution was allowed to stand at 30° C. After 40 minutes, milky white hydrogel containing no bubbles was obtained.

EXAMPLE 7

One hundred parts of the hydrophilic urethane prepolymer (A) used in Example 1, 4.5 parts of imidazole and 4.3 parts of ethanol were reacted under agitation at 70° C. for 4 hours, and thus 108.8 parts of a urethane prepolymer composition partially blocked with imidazole was obtained. Fifteen (15) parts of this blocked urethane prepolymer composition was dissolved in 85 parts of water and the solution was allowed to stand at 25° C. After 50 minutes, milky white hydrogel containing no bubbles was obtained.

EXAMPLE 8

Polyethylene glycol having molecular weight 4,000 was reacted with an excess amount of the tolylene diisocyanate used in Example 1, and urethane prepolymer containing 7% of unreacted tolylene diisocyanate was obtained. (The NCO group content was 5.2%.)

One hundred (100) parts of this urethane prepolymer was reacted with 4.4 parts of imidazole and 5.8 parts of phenol under agitation at 90° C. for 2 hours. Thus, 110.2 parts of a urethane prepolymer composition partially blocked with imidazole was obtained. Twenty-five (25) parts of this blocked urethane prepolymer was dissolved in 75 parts of water and the solution was allowed to stand at 30° C. After 40 minutes, hydrogel containing no bubbles was obtained.

EXAMPLE 9

An addition product of stearyl amine and 50 moles of ethylene oxide was reacted with an excess amount of the tolylene diisocyanate used in Example 1 and a prepolymer containing 3.0% of free NCO groups was obtained.

One hundred (100) parts of this prepolymer was reacted with 5.0 parts of imidazole under agitation at 70° C. for 2 hours and 105 parts of an imidazole-blocked urethane prepolymer composition was obtained. Twenty (20) parts of this blocked urethane prepolymer composition was dissolved in 80 parts of water and the solution was allowed to stand at 20° C. After 70 minutes, transparent hydrogel containing no bubbles was obtained.

EXAMPLE 10

One hundred parts of the hydrophilic urethane prepolymer (A) used in Example 1 was reacted with 33 parts of 2-chloro-4,6-bis-ethylamino-S-triazine under agitation at 60° C. for 3 hours and thus 133 parts of a composition of urethane prepolymer blocked with 2-chloro-4,6-bis-ethylamino-S-triazine was obtained. Ten (10) parts of this blocked urethane prepolymer was dissolved in 90% of water and the solution was allowed to stand at 30° C. After 10 hours, milky white hydrogel containing no bubbles was obtained.

COMPARATIVE EXAMPLE 1

One hundred (100) parts of hydrophilic urethane prepolymer (A) used in Example 1 was reacted with 15.4 parts of phenol in the presence of 0.3 part of 1,4-diazabicyclo-2,2,2-octane, a tertiary amine catalyst, under agitation at 80° C. for 3 hours, and thus a phenol-blocked urethane prepolymer composition was obtained. Twenty (20) parts of this blocked urethane prepolymer composition was dissolved in 80 parts of water and the solution was allowed to stand at 30° C. for 1 week. But formation of hydrogel was not recognized.

COMPARATIVE EXAMPLE 2

One hundred (100) parts of the hydrophilic urethane prepolymer (A) used in Example 1 was reacted with 11.6 parts of pyrrolidine in the presence of 0.2 part of 1,4-diazabicyclo[2,2,2]-octane under agitation at 90° C. for 3 hours, and a pyrrolidine-blocked urethane prepolymer composition was obtained. Twenty (20) parts of this composition was dissolved in 80 parts of water and the solution was allowed to stand at 40° C. for 1 week. But formation of hydrogel was not recognized.

COMPARATIVE EXAMPLE 3

One hundred (100) parts of the hydrophilic urethane prepolymer (A) used in Example 1 was reacted with 11.2 parts of pyrazol under agitation at 50° C. for 2 hours and a pyrazol-blocked urethane prepolymer composition was obtained. Twenty (20) parts of this blocked urethane prepolymer composition was dissolved in 80 parts of water and the solution was allowed to stand at 30° C. for 1 week. But formation of hydrogel was not recognized.

COMPARATIVE EXAMPLE 4

One hundred (100) parts of the hydrophilic urethane prepolymer (A) used in Example 1 was reacted with 13.5 parts of 2-methylpyrazoline under agitation at 60° C. for 2 hours and a pyrazoline-blocked urethane prepolymer composition was obtained. Twenty (20) parts of this blocked urethane prepolymer composition was dissolved in 80 parts of water and the solution was allowed to stand at 30° C. for 1 week. But formation of hydrogel was not recognized.

EXAMPLE OF USE

Evaluation as a grouting material.

A 20% aqueous solution of the imidazole-blocked urethane prepolymer composition prepared in Example 1 was used as Sample Solution.

A 20% aqueous solution of the unblocked hydrophilic urethane prepolymer prepared in Example 1 was used as Comparative Test Solution.

The two solution were respectively poured into a glass cylinder 20 cm in inner diameter and 100 cm in height filled with siliceous sand (100 mesh), and depth of infiltration, gelling time and gel formation of each solution were observed in the atmosphere of 30° C. The results are summarized in the following table.

| Test sample | Gelling time | Depth of infiltration | Gel formation |
|---|---|---|---|
| Sample Solution | 40 minutes | 100 cm | Hydrogel containing no bubbles was formed. |
| Comparative Test Solution | 2 minutes | 9.6 cm | Hydrogel containing bubbles was formed. |

It is well learned from this table that the slow-curing water-curable urethane prepolymer composition of this invention is far superior to the known counterpart as the grouting material in workability and infiltration in soil.

EXAMPLE 11

One hundred (100) parts of the hydrophilic urethane prepolymer (A) used in Example 1 was reacted with 15.6 parts of 3-hydroxypyridine under agitation at 80° C. for 2 hours, and 115.6 parts of a hydroxypyridine-blocked urethane prepolymer composition was obtained. The thus obtained composition was analyzed by IR absorption spectrometry and absorption at 2250 $cm^{-1}$ for the NCO group was not recognized. That is, it was proved that there existed no free NCO groups in the molecule.

Twenty (20) parts of this blocked urethane prepolymer composition was dissolved in 80 parts of water and the solution was allowed to stand at 20° C. After 3 hours, transparent hydrogel containing no bubbles was formed.

EXAMPLE 12

One hundred (100) parts of the urethane prepolymer (A) used in Example 1 was reacted with 23.8 parts of 8-hydroxyquinoline under agitation at 70° C. for 4 hours and 123.8 parts of an 8-hydroxyquinoline-blocked urethane prepolymer composition was obtained. Fifteen (15) parts of this blocked urethane prepolymer composition was dissolved in 85 parts of water and the solution was allowed to stand at 25° C. After 20 hours, milky white hydrogel containing no bubbles was formed.

EXAMPLE 13

Eighty-two point nine (82.9) parts of an addition product of ethylene diamine and 80 moles of ethylene oxide was reacted with 17.1 parts of the tolylene diisocyanate used in Example 1 and 100 parts of urethane prepolymer (A) containing 1% of unreacted tolylene diisocyanate was obtained. (The percentage of the unreacted free NCO groups was 4.37%.) One hundred (100) parts of this urethane prepolymer was reacted with 10.4 parts of 2-hydroxypyridine under agitation at 80° C. for 3 hours, and 110.4 parts of a 2-hydroxypyridine-blocked urethane prepolymer composition was obtained.

Ten (10) parts of this blocked urethane prepolymer was dissolved in 90 parts of water and the solution was allowed to stand at 10° C. After 30 minutes, hydrogel containing no bubbles was obtained.

COMPARATIVE EXAMPLE 5

One hundred (100) parts of the urethane prepolymer (A) used in Example 1 was reacted with 18.6 parts of ε-caprolactam in the presence of 0.05 parts of 1,4-diazabicyclo-[2,2,2]-octane at 80° C. for 3 hours and thus 118.6 parts of an ε-caprolactam-blocked urethane prepolymer was obtained.

Twenty (20) parts of this blocked urethane prepolymer composition was dissolved in 80 parts of water and the solution was allowed to stand at 30° C. for 1 week. But formation of hydrogel was not recognized.

EXAMPLE 14

An emulsion was prepared by dispersing 50 parts of asphalt and 40 parts of atactic polypropylene in water with the aid of 10 parts of poly(vinyl alcohol). The solid content of this emulsion was 60%.

Modified emulsions were prepared by adding the imidazole-blocked urethane prepolymer composition prepared in Example 1 to the above emulsion in proportions of 1.6%, 2.5%, 3.2% and 4.8% respectively. The thus modified emulsions were respectively coated on glass plates. After 2 hours, these glass plates were immersed in water, and 2 hours later, the degree of re-emulsification in curing of these aqueous emulsions was determined. The results are summarized in the following table.

| Amount of added imidazole-blocked urethane prepolymer (%) | 0 | 1.6 | 2.5 | 3.2 | 4.8 |
|---|---|---|---|---|---|
| Degree of re-emulsification (%) | 100 | 73.4 | 0.31 | 0.16 | 0 |

Incidentally, the aqueous emulsions containing the imidazole-blocked urethane prepolymer composition in a concentration in the range of 2.5–4.8% remain spreadable up to 2 hours after addition of said composition, and the resulting coating membranes are free from bubbles.

EXAMPLE 15

To an aqueous emulsion sealant consisting of 28 parts of an aqueous emulsion containing 50% of 2-ethylhexyl acrylate polymer as the solid ingredient, 56 parts of calcium carbonate, 14 parts of chlorinated paraffin and 2 parts of dibutyl phthalate, the imidazole-blocked urethane prepolymer composition obtained in Example 1 was added in proportions of 1.1%, 2.2% and 3.3% respectively. These modified emulsions were coated on glass plates. Two hours after coating, the glass plates were immersed in water, and 4 hours later, the degree of re-emulsification in curing of these emulsion sealants was measured. The result was summarized in the following table.

| Amount of added imidazole-blocked urethane prepolymer (%) | 0 | 1.1 | 2.2 | 3.3 |
|---|---|---|---|---|
| Degree of re-emulsification (%) | 100 | 95.5 | 2.76 | 0.52 |

Incidentally, the aqueous emulsions containing the imidazole-blocked urethane prepolymer in a concentration in the range of 2.2–3.3% remain spreadable up to 2 hours after addition of said composition, and the resulting coating membranes are free from bubbles.

EXAMPLE 16

To SBR latex (the solid ingredient content 70%), the 3-hydroxypyridine-blocked urethane prepolymer obtained in Example 11 was added in concentrations of 1.4%, 2.8% and 4.2% on the basis of the solid content of the emulsion respectively. The modified emulsions were coated on glass plates. After 2 hours, the glass plates were immersed in water, and 4 hours later, the degree of re-emulsification in curing of these modified aqueous emulsions was measured. The results are summarized in the following table.

| Amount of added 3-hydroxypyridine-blocked urethane prepolymer composition (%) | 0 | 1.4 | 2.8 | 4.2 |
|---|---|---|---|---|
| Degree of re-emulsification (%) | 100 | 82.3 | 1.20 | 0.38 |

Incidentally, the aqueous emulsions containing the 3-hydroxypyridine-blocked urethane prepolymer composition in a concentration in the range of 2.8–4.2% are spreadable up to 3 hours after addition of said composition, and the formed coating membranes are free from bubbles.

EXAMPLE 17

To an aqueous emulsion of poly(vinyl acetate) (the solid ingredient content 60%), the 8-hydroxyquinolineblocked urethane prepolymer composition obtained in Example 12 was added in concentrations of 1.6%, 3.2% and 4.8% respectively. The modified emulsions were coated on glass plates. After 2 hours, the glass plates were immersed in water, and 4 hours later, the degree of re-emulsification in curing of these emulsions was measured. The results are summarized in the following table.

| Amount of added 8-hydroxyquinoline-blocked urethane prepolymer composition (%) | 0 | 1.6 | 3.2 | 4.8 |
|---|---|---|---|---|
| Degree of re-emulsification (%) | 100 | 88.3 | 1.57 | 0.41 |

Incidentally, the aqueous emulsions containing the 8-hydroxyquinoline-blocked urethane prepolymer composition in a concentration in the range of 3.2-4.8% are spreadable up to 6 hours after addition of said composition, and the resulting coating membranes are free from bubbles.

COMPARATIVE EXAMPLE 6

To 100 parts of an aqueous emulsion sealant comprising 28 parts of an aqueous emulsion containing 50% of 2-ethylhexyl acrylate polymer as the solid ingredient, 56 parts of calcium carbonate, 14 parts of chlorinated paraffin and 2 parts of dibutyl phthalate, ε-caprolactam-blocked urethane polymer composition obtained in Comparative Example 5 was added in amounts of 1.1%, 2.2% and 3.3% on the basis of the weight of the solid ingredient of the emulsion respectively. The thus modified emulsions were coated on glass plates. After two hours, the glass plates were immersed in water, and 4 hours later, the degree of re-emulsification of these modified emulsion sealants were measured. The results are summarized in the following table.

| Amount of added ε-caprolactam-blocked urethane prepolymer composition (%) | 0 | 1.1 | 2.2 | 3.3 |
|---|---|---|---|---|
| Degree of re-emulsification (%) | 100 | 99 | 98 | 98 |

EXAMPLE 18

To an aqueous emulsion comprising 30 parts of poly(vinyl acetate) emulsion the solid ingredient content of which was 60% and 70 parts of an asphalt emulsion the solid ingredient content of which was 53%, said aqueous emulsion having viscosity of 1500 cps (25° C.), the imidazole-blocked urethane prepolymer composition obtained in Example 1 was added in proportions of 0.5%, 1%, 1.5% and 1.8% respectively. After 3 hours, the viscosity of the thus modified aqueous emulsions was measured. The results are summarized in the following table.

| Amount of added imidazole-blocked urethane prepolymer composition (%) | 0 | 0.5 | 1.0 | 1.5 | 1.8 |
|---|---|---|---|---|---|
| Viscosity of modified emulsion (cps., 25° C.) | 1,500 | 16,000 | 30,000 | 58,000 | 90,000 |

EXAMPLE 19

To an aqueous emulsion obtained by emulsifying 50 parts of asphalt and 40 parts of atactic polypropylene in 100 parts of water with the aid of 10 parts of poly(vinyl alcohol), of which the solid ingredient content was 50% and the viscosity was 3,200 cps, the imidazole-blocked urethane prepolymer composition obtained in Example 1 was added in proportions of 0.5%, 1.0%, 1.5% and 1.8% respectively. After 3 hours, the viscosity of these modified emulsions was measured. The results are summarized in the following table.

| Amount of added imidazole-blocked prepolymer composition (%) | 0 | 0.5 | 1.0 | 1.5 | 1.8 |
|---|---|---|---|---|---|
| Viscosity of emulsion (cps, 25° C.) | 3,200 | 25,000 | 48,000 | 94,000 | 136,000 |

INDUSTRIAL APPLICABILITY

As has been stated above, the slow-curing water-curable urethane prepolymer composition of this invention is useful as a grouting material; as a hydrogel former usable as fixative for perfumes or carrier for fertilizers; as a vehicle for coating materials; as a thickener for aqueous resin emulsions; or as a modifier for aqueous resin emulsions to prevent reemulsification in the course of curing. Thus, the composition will contribute to development of technologies in varied industrial fields.

We claim:

1. A slow-curing water-curable urethane prepolymer composition obtained by reacting (A) a hydrophilic urethane prepolymer which is the reaction product of a polyisocyanate and a hydrophilic polyol prepolymer and has at least two free —NCO groups and (B) a blocking agent selected from a class consisting of heterocyclic compounds having an structure in the molecule thereof, hydroxypyridines and hydroxyquinolines in such a proportion that the equivalent ratio of the =NH groups or the —OH groups in the blocking agent (B) to the —NCO groups in the hydrophilic urethane prepolymer (A) (=NH or —OH-/—NCO) is 0.05 to 2.

2. The composition as claimed in claim 1, wherein the hydrophilic polyol prepolymer is one selected from the class consisting of:
(a) addition polymerization products of ethylene oxide the molecular weight of which is 1,000 to 20,000;
(b) polyether-polyols which are copolymers of ethylene oxide and an alkylene oxide having 3-6 carbon atoms in an amount of not more than 50 mole percent of said copolymer and has molecular weight of 1,000 to 20,000;
(c) addition products of an aliphatic amine, an aliphatic amide, a dicarboxylic acid or a multifunctional alcohol and ethylene oxide;
(d) polyester-polyols;
(e) copolymers of one of styrene, acrylic esters, methacrylic esters, with one of hydroxyethyl acrylate and hydroxyethyl methacrylate; and (f) polyols having at least one of —OSO$_3$M group, —SO$_3$M group, wherein M is a monovalent alkali metal, quaternary ammonium radicals and at least two —OH groups in their molecule.

3. The composition as claimed in claim 2, wherein the hydrophilic polyol prepolymer of the component (A) is selected from the class consisting of:

(a) addition polymerization products of ethylene oxide, the molecular weight of which is 1,000 to 20,000;

(b) polyether-polyols which are copolymers of ethylene oxide and an alkylene oxide having 3–6 carbon atoms in an amount of not more than 50 mole percent of said copolymer, and has molecular weight 1,000 to 20,000;

(c) ethylene oxide addition products of a member selected from a class consisting of coco amine, soy bean amine, tallow amine, stearyl amine, ethylene diamine, tetramethylene diamine, hexamethylene diamine, piperadine, hydrogenated tallow amide, oleylamide, phthalic acid, maleic acid, succinic acid, malonic acid, adipic acid, trimethylol propane and glycerine;

(d) polyester-polyols selected from a class consisting of ethylene oxide addition products of copolyesters of one of tetramethylene glycol and polyethylene glycol and one of phthalic acid, maleic acid, succinic acid, malonic acid and adipic acid; and polyester-polyols which are coesters of polyethylene glycol having molecular weight not less than 200 and one of phthalic acid, maleic acid, succinic acid, malonic acid with adipic acid and have at least two —OH groups at the ends of the molecule;

(e) copolymers of one of styrene, acrylic esters, methacrylic esters and one of hydroxyethyl acrylate and hydroxyethyl methacrylate;

(f) polyols which have at least one of —OSO$_3$M group, —SO$_3$M group, wherein M is a monovalent alkali metal, and quaternary ammonium radicals and at least two —OH groups.

4. The composition as claimed in any of claims 1–3, wherein the polyisocyanate of the component (A) is selected from the class consisting of ethylene diisocyanate, 1,4-tetramethylene diisocyanate, 1,6-hexamethylene diisocyanate, 1,3-dodecane diisocyanate, cyclobutane-1,3-diisocyanate; cyclohexane-1,3- or 1,4-diisocyanate, or mixtures of these isomers; 1-isocyanato-2-isocyanato-methylcyclopentane, 1-isocyanato-3,3,5-trimethyl-5-isocyanato-methylcyclohexane; perhydro-2,4'- or -4,4'-diphenylmethane isocyanate of mixtures thereof; 1,3- or 1,4-phenylene diisocyanate or mixtures thereof; 1,2-xylylene diisocyanate, 1,3-xylylene diisocyanate, 1,4-xylylene diisocyanate or mixtures thereof; 2,4- or 2,6-tolylene diisocyanate or mixtures thereof; diphenylmethane-2,4- or 4,4'-diisocyanate or mixtures thereof, naphthalene-1,5-diisocyanate, triphenylmethane-4,4',4"-triisocyanate; polyphenylpolymethylene polyisocyanate obtained by condensing aniline with formaldehyde followed by phosgenizing, and various mixtures of the above-mentioned compounds.

5. The composition as claimed in claim 4, wherein the polyisocyanate of the component (A) is selected from a class consisting of 2,6-tolylene diisocyanate, 2,4-tolylene diisocyanate, diphenylmethane-4,4'-diisocyanate, 1,2-xylylene diisocyanate, 1,3-xylylene diisocyanate, 1,4-xylylene diisocyanate, naphthalene diisocyanate, polyphenylene diisocyanate, 1,6-hexamethylene diisocyanate and mixtures thereof.

6. The composition as claimed in any of claims 1–5, wherein the component (B) is a heterocyclic compound which has an structure.

7. The composition as claimed in claim 6, wherein the equivalent ratio of the =NH group in the component (B) to the —NCO group in the component (A) is 0.2–2.

8. The composition as claimed in claim 6, wherein a conventional blocking agent selected from phenols, ε-caprolactam and benzophenone-oxim in an amount not more than 3 times the molar amount of the component (B) is used in combination with the component (B).

9. The composition as claimed in any of claims 6–8, wherein the component (B) is selected from the compounds represented by the general formulas:

wherein R$^1$ is selected from H, C$_n$H$_{2n+1}$, C$_6$H$_5$ and CH$_2$C$_6$H$_5$; R$^2$ is selected from Cl, OCH$_3$, and SCH$_3$; R$^3$ is selected from CH$_3$, C$_2$H$_5$ and CH(CH$_3$)$_2$; n is an integer of 1–6.

10. The composition as claimed in claim 9, wherein the component (B) is selected from a class consisting of imidazole, benzimidazole, 2-methylimidazole, 2-ethylimidazole, 2-phenylimidazoline, 2-chloro-4,6-bisethylamino-S-triazine, 2-methoxy-4,6-bis-ethylamino-S-triazine.

11. The composition claimed in any of claims 1-5, wherein the component (B) is selected from a class consisting of 2-hydroxypyridine, 3-hydroxypyridine, 4-hydroxypyridine, 2-hydroxyquinoline, 4-hydroxyquinoline and 8-hydroxyquinoline.

12. An improved aqueous resin emulsion composition, which contains a slow-curing water-curable urethane prepolymer composition obtained by reacting (A) a hydrophilic urethane prepolymer composition which is a reaction product of a polyisocyanate and a hydrophilic polyol prepolymer and has at least 2 free —NCO groups and (B) a blocking agent selected from a class consisting of heterocyclic compounds having an structure in the molecule thereof, hydroxypyridines, and hydroxyquinolines, in such a proportion that the equivalent ratio of the =NH groups or —OH groups of the component (B) to the —NCO groups of the component (A) is 0.05-2, in an amount of 0.05-10 parts by weight per 100 parts of the solid ingredient content of said emulsion.

13. The composition as claimed in claim 12, wherein said aqueous resin emulsion is selected from a class consisting of aqueous resin emulsions of ethylene-vinyl acetate copolymer, atactic polypropylene, bitumen materials, poly(vinyl acetate), poly(acrylic ester), acrylic ester-vinyl acetate copolymers, acrylic ester-styrene copolymers, vinyl chloride-vinylidene chloride copolymers, chloroprene rubber and styrene butadiene rubber.

14. The composition claimed in claim 12 or 13, which is thickened by containing said slow-curing water-curable urethane prepolymer composition in an amount of 0.05-2 parts by weight per 100 parts of the solid ingredients of said aqueous resin emulsion.

15. The composition claimed in claim 12 or 13, which is stabilized against re-emulsification by containing said slow-curing water-curable urethane prepolymer composition in an amount of 2-10 parts by weight per 100 parts of the solid ingredient of said aqueous resin emulsion.